United States Patent [19]

Monsheimer et al.

[11] 4,314,800
[45] Feb. 9, 1982

[54] METHOD FOR TREATING PELTS AND LEATHER

[75] Inventors: Rolf Monsheimer; Ernst Pfleiderer, both of Darmstadt; Werner Siol, Pfungstadt; Hanns Boessler, Darmstadt; Hans Trabitzsch, Seeheim-Jugenheim, all of Fed. Rep. of Germany

[73] Assignee: Röhm GmbH, Darmstadt, Fed. Rep. of Germany

[21] Appl. No.: 252,164

[22] Filed: Apr. 8, 1981

[30] Foreign Application Priority Data

Apr. 11, 1980 [DE]  Fed. Rep. of Germany ....... 3013912

[51] Int. Cl.$^3$ .............................................. C14C 11/00
[52] U.S. Cl. .................................. 8/94.1 R; 8/94.18; 8/94.19 R; 8/94.19 C; 8/94.33; 260/8; 260/17 R; 260/17 A; 260/29.6 TA
[58] Field of Search ..................... 8/94.19 R, 94.19 C, 8/94.33, 94.1 R, 94.18; 536/312

[56] References Cited

U.S. PATENT DOCUMENTS

| 3,340,237 | 9/1967 | Sellet | 8/94.1 R |
|---|---|---|---|
| 3,584,121 | 6/1971 | Krayenbuhl et al. | 424/178 |
| 3,617,458 | 11/1971 | Brockman | 260/29.6 H |
| 3,945,792 | 3/1976 | Wurmli et al. | 8/94.1 R |
| 4,179,333 | 12/1979 | Braeumer et al. | 435/69 |
| 4,190,687 | 2/1980 | Susiura et al. | 8/94.1 R |
| 4,210,721 | 7/1980 | Monsheimer et al. | 435/69 |

FOREIGN PATENT DOCUMENTS

| 976963 | 12/1964 | United Kingdom . |
|---|---|---|
| 1185283 | 3/1970 | United Kingdom . |
| 1235293 | 6/1971 | United Kingdom . |
| 1463516 | 2/1977 | United Kingdom . |
| 1546822 | 5/1979 | United Kingdom . |
| 2045278 | 10/1980 | United Kingdom . |

OTHER PUBLICATIONS

Chem. Abstracts 62, 6682a, (1965).
Chemical Abstracts 62, 16527g, (1965).
Chemical Abstracts 75, 64675e, (1971).

*Primary Examiner*—A. Lionel Clingman
*Attorney, Agent, or Firm*—Curtis, Morris & Safford

[57] ABSTRACT

What is disclosed are a method for treating pelts or leather in the beamhouse, for tanning, or as an aftertreatment, which method comprises contacting said pelts or leather with an aqueous solution or dispersion of a copolymer comprising monomers of a nitrogenous ester of acrylic acid or of methacrylic acid, a further different ester of acrylic acid or of methacrylic acid, and acrylic acid or methacrylic acid, whereby portions of said copolymer are deposited in the grain layer without formation of a superficial film, and pelts and leather treated by this method.

20 Claims, No Drawings

METHOD FOR TREATING PELTS AND LEATHER

The present invention relates to methods for treating pelts and leather with a solution or dispersion of a polymer to improve grain characteristics, to the pelts or leather so treated, and to the polymer solutions or dispersions employed in the method.

Blemishes in the condition of the grain reduce the value of leather considerably, though their effect on its mechanical properties is usually insignificant.

Among such blemishes are, for example, "blind grain", i.e. a condition in which the grain surface of the leather does not have an even shine but presents areas which are matte and lackluster in appearance.

The cause of such defects, which are usually restricted to the intermediate surface, is that the tight interlacing of extremely fine collagen fibrils which is responsible for the natural shine of the grain has been destroyed by microbiological, chemical, or mechanical damage to the interlaced fibers of the skin.

The slightest attack on the material of the skin, whether caused by incipient decay caused by delayed curing or by unsatisfactory or improper curing, by improper soaking, liming or bating, or by excessive action of bating enzymes, etc., results in a matte and lackluster aspect of the grain layer in the damaged areas.

If not too pronounced, dull spots in sole leather are acceptable as "beauty spots" in the material. However, their presence reduces the value of upper or fine leather goods to a large degree because the damage will first become readily apparent as the result of an uneven absorption of the tanning, coloring, and greasing agents by the affected areas in the grain.

In addition, as mentioned before, those other properties of leather which determine its useful capacity are barely, or not at all, affected by the aforementioned surface damage to the grain. It is therefore all the more disturbing that until now, leather with such defects in the grain could not be used in accordance with its other qualities.

In order to produce the largest amounts of soft, aniline-dyed leather, tanning agents have been sought which would allow elimination of the surface damage described above. This must not involve the build-up of a film on the leather surface, since this would reveal that the leather has been post-treated. Again, this would immediately entail a considerable decrease in value. In addition, a sticky surface has to be avoided at all costs.

For a long time now, the possibility has been investigated of compensating structural differences in skins resulting from, for example, the non-uniform structure of the collagen fiber network in various parts of the skins, through the inclusion of foreign matter. In this respect, special attention has been given to the use of resins obtained by condensing formaldehyde with urea, thiourea, melamine, or dicyanamide. "Resin tannings" of this nature, however, have the disadvantage of being tannings which can readily lead to a possible hardening of the leather. There are also numerous research efforts concerning the use of acrylic and methacrylic acids and their derivatives in the tannery. Methods involving the inclusion of polymers comprising acrylic and methacrylic acid ester in vegetable-tanned leathers have been rejected because they were too complicated and expensive; moreover, they impaired the absorption of water vapor and caused too great a stiffening of the leather. Further attempts to obtain a tanning effect were made with polymerizable substances on untanned skins. However, the resulting leather was too "empty", and neither the tanning process nor a similarly obtained "bottom leather impregnation" gained status as a standard practice [cf. W. Pauckner, Leder- und Haeutemarkt 51, 607–619 (1976)].

Recent research has been aimed at overcoming the difficulties indicated. In the first place, attempts were made to include commonly available polymerized polymer derivatives in split bull hides and sheepskins. The introduction of these commercially available products takes place after the wetting-back (normal wet-back) of the intermediately dried leather, whereby between 1 and 5 percent of dry solids, by dry weight of the leather, are applied. In further tests, monomers were included and their polymerization carried out in the leather itself. As components of the homopolymer derivatives, methyl methacrylate, ethyl acrylate, and butyl acrylate were used. The copolymers used were also formed from the monomers mentioned. Acrylic acid and methacrylic acid in amounts totalling 7 percent were added to the polymers of ethyl acrylate and butyl acrylate. According to Pauckner (loc. cit.), the use of butyl acrylate entails disadvantages for several reasons. Thus, when using products consisting of pure butyl acrylate or copolymers containing a large amount of butyl acrylate, it becomes clear that the water absorption by the leather becomes less and less, because the capacity of the leather to swell, or to absorb water, is greatly diminished by the butyl residue.

Other prior art proposes various auxiliaries for treatment—particularly for tanning hides—consisting of copolymers of an unsaturated organic acid having a copolymerizable double bond and a quaternized tertiary amine among whose substituents at least one has a copolymerizable double bond. The example is given of a copolymer consisting of 115 parts of monomeric acrylic acid with a 65 percent solids content and 31.5 parts of dimethylaminoethyl methacrylate, quaternized with methyl sulfate, having an 80% solids content.

According to this art, the auxiliaries are used during the tannage or retannage of the hides, but it is possible to add them sooner to the pickle baths in which standard mineral acids and organic acids are used.

From works by Trakhtenberg et al. it is known that casein or collagen hydrolyzate modified by methyl acrylate and/or butyl acrylate is used as a leather finish. (Cf. Chem. Abstr. 62, 6681a; 60, 9493, 62, 16 527 g, 75, 64 675, USSR-PS 171 564).

The problem of finding suitable technical ways of compensating for the negative effects of blemishes in priorly treated leather, particularly damage to the grain by microorganisms, on the outward appearance of naturally dyed leather was not satisfactorily solved by any of these measures.

Any improvement of the grain by wheeling, pore filling, or the application of several dressing layers during finishing cannot overcome the fact that leather treated in this way is inferior in comparison with naturally dyed, soft aniline leather. The feel of soft leathers cannot be achieved through an intensive dressing process.

It has now been found that not only could the aforementioned problem be solved in a satisfactory manner but that totally unexpected advantages could be realized by treating pelts and/or leather with polymer products in the form of solutions or aqueous dispersions prepared by the polymerization of monomers of nitrogenous esters of acrylic and/or methacrylic acids, esters of acrylic and/or methacrylic acids, and acrylic and/or methacrylic acids.

The polymers advantageously contain 5 to 25 percent of esters of acrylic and/or methacrylic acids containing a nitrogenous group, 67 to 92 percent of other esters of acrylic and/or methacrylic acids, and 1 to 8 percent of acrylic and/or methacrylic acids, by total weight of the copolymers, whereby the average molecular weight ($\overline{M}$) of the copolymer is, as a rule, between $2(10^4)$ and $5(10^6)$.

In order for the polymer derivative to be suitable, the glass temperature, $T_g$, has to be below room temperature.

The nitrogeneous esters of acryl and/or methacryl acids are preferably compounds of the formula compress as

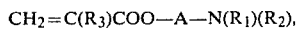

$$CH_2=C(R_3)COO-A-N(R_1)(R_2),$$

wherein $R_1$ and $R_2$ are alkyl having 1 to 4 carbon atoms, $R_3$ is hydrogen or methyl, and A is either alkyl having up to 10 carbon atoms or a ring group, optionally substituted by alkyl groups, having up to 10 carbon atoms and, preferably, 5 or 6 ring members. If A is alkyl, it may be straight-chain or branched. If branched, the main chain contains from 2 to 5 carbon atoms, preferably from 2 to 4 carbon atoms. If A is a ring system, the ring may be carbocyclic (i.e. A is aryl, aralkyl, or cycloalkyl) or heterocyclic with an O or N hetero atom therein. Exemplary are dialkylamino benzyl esters such as m-dimethylaminobenzyl ester, furfuryl esters, particularly 5-dialkylaminoalkyl furfuryl esters such as 5-diethylaminoethyl furfuryl ester, and amino-cyclohexyl esters, e.g. 3-dimethylamino-3,5,5-trimethyl cyclohexyl ester.

The other acrylic and/or methacrylic acid esters which are suitable according to the invention are those of alcohols having 1 to 14 carbon atoms, preferably 1 to 8 carbon atoms, and particularly 1 to 4 carbon atoms, all suitably alkanols.

A polymer which is particularly preferred comprises butyl acrylate, methyl methacrylate, dimethylaminoethyl acrylate, and acrylic acid, especially in the respective proportions of (70–85):(5–15):(5–15):(1–5), wherein the ranges given are percentages by weight of all the monomers employed.

Graft polymers of the aforementioned monomers on protein hydrolyzates or water-soluble proteins and/or polysaccharides have proved particularly advantgeous, particularly with respect to the absence of tack. Graft polymers on hydrolyzates of collagen, elastin, or keratin should be especially mentioned. Such hydrolyzates are known from German Patent Publication No. 26 43 012, 27 05 670, and 27 05 671. The hydrolyzates preferably have an average molecular weight ($\overline{M}$) of 1000 to 15000, particularly 1500 to 12000. The use of a collagen hydrolyzate having between 10 and 100 amino acids per molecule, particularly between 10 and 30 amino acids per molecule, is especially preferred. The manufacture of aqueous polymer dispersions in which acrylates or methacrylates are polymerized by grafting onto protein hydrolyzates or polysaccharides is a known procedure (cf. Chem. Abstr. 73, 121576 and 75, 64675; USSR Pat. Nos. 175,227 and 171,564, and German Patent Publication No. 1,162,342).

Preferably, proteins or polysaccharides are used as the backbone for the grafting, with monomers in a weight proportion of 1:30 up to 1:5. It is possible to add more protein hydrolyzate and/or polysaccharide to the grafted protein hydrolyzate or polysaccharide, e.g. up to a weight proportion of total protein hydrolyzate or polysaccharide (including that present in the graft copolymer) to the graft copolymers of 1:5 to 1:1. The polymer content of the product advantageously is in the range of 30 to 45 percent by weight, preferably in the range of 35 to 45 percent. Aqueous polymer dispersions having a composition according to the invention and an average particle radius between 200 and 4000 Angstrom units are particularly recommended.

As backbones for polysaccharide grafts, decomposed and modified starches or cellulose are particularly appropriate. [Cf. Houben-Weyl, 4th edition, *Makromolekulare Stoffe* (Macromolecular Substances), Part 1, Vol. 14/1, p. 395,404 ff].

The polymer products according to the invention, particularly in the form of stable dispersions, are highly suitable, inter alia, for the retannage of chrome leather, or for solo tannage using polymeric mineral tanning agents or syntans for dressing pelts, for tanning white leather, for pre-tanning of synthetic vegetable-tanned leather, for restoring leather, etc. The uniformity of the leather dying which is attained should be stressed. Furthermore, the improvement in grease absorption is worth mentioning.

A particular advantage of the methods of the invention is that they lead to a deposition of polymer in the grain layer, but without detectible film formation or a change in the feel of the leather, e.g. without any stiffening of the leather.

The tanning action of the polymer products according to the invention can be improved by combination with mineral tanning substances. Solution-stable products are obtained with chrome alum and masked chromium-III compounds. Combinations with aluminum chloride, aluminum sulfate, aluminum di- and triformate as well as zirconium sulfate are also possible. Solution-stable products with neutral and acidic high-molecule polyphosphates can also be obtained.

When used for retanning chrome leather, polymeric tanning products containing chromium-III compounds—in addition to the previously mentioned advantages with regard to the elimination of grain defects—lead to a marked improvement in the fullness of the leather without affecting the character of chrome leather as far as the grain and feel are concerned. The feel of the leather is improved in softness. The chrome liquor residues contain considerably fewer chromium compounds than when chromium-III tanning agents are used alone.

During the dyeing process following retannage, a markedly more uniform distribution of the dye is observed. The absorbency of the leather for the dressing also becomes more homogeneous, even in structurally different parts of the skin. The physical properties of the leather, e.g. values for tensile strength, resistance to tear propagation, stretch, and elasticity of the grain, improve considerably (up to 20 percent).

The possible uses of ampholytic emulsion copolymers according to the invention, alone or in combination with mineral tanning substances, in chrome leather are in retannage, after dyeing, and after greasing. When used after dyeing and greasing, these copolymers improve the binding as well as the fixing of the dyes and greasing agents in the fibers of the leather.

For retannage, the dispersion of the invention (or mineral polymer tanning agent) is used in an amount of 3 to 8 percent, by weight of the shaved leather. The retannage can be combined with neutralization of the chrome leather, or it can be carried out in a separate bath. As a fixing agent for the dyes and greasing agents, 1 to 3 percent of the material, by weight of the shaved leather, is sufficient.

The polymer products according to the invention can, for example, be used as follows:

Retannage of the chrome leather

As described earlier, the use according to the invention of ampholytic dispersions, or of mixtures thereof with mineral tanning substances, not only eliminates grain damage but improves the chemical and physical properties of chrome leather as well.

Combinations of chromium-III tanning agents with emulsion copolymer derivatives according to the invention are particularly suitable. They can be used before or after neutralization or as an intermediate treatment. The amounts used are between 2 and 4 percent relative to the shaved weight.

Retanning may be done without a float, or with float lengths of 50 to 150 percent based on the shaved weight. A favorable bath temperature is one between 25° C. and 30° C., with a treatment time between 60 and 120 minutes. A short wash is recommended before undertaking the next step.

Solo-tannage with mineral polymer tanning substances

Combinations of mineral tanning substances with the dispersions according to the invention are suitable in general for the conversion of raw hides and pelts into leather. Relative to the pelt weight, about 10 to 30 percent are required. It is possible to attain a thermostability corresponding to the boiling test. Particularly high chromium consumptions can be achieved, e.g. 1 g of $Cr_2O_3$ per liter.

Direct tanning without a previous pickling is also possible.

Dressing of fur skins

Aluminum polymer tanning agents are exclusively used for the dressing of furskins. In order to dress furskins, 30 to 50 g of the aluminum polymer tanning agents are added to the pickle bath. The dose depends on the type of skin, i.e. sheep, kid, lamb, mink, etc., which is to be dressed.

The advantage in dressing furskins with aluminum polymer tanning products, as compared with dressing with potash alum or aluminum sulfate, is the increased fastness resulting from the tanning action. The pelts are no longer hygroscopic and the tanning agent does not wash out if it becomes slightly damp.

Tanning of white leather

It is particularly important in the preparation of white leather to use tanning agents which do not produce yellowing. These requirements are met in particular by polymeric tanning agents comprising aluminum and zirconium salts.

The best leather qualities are achieved with combinations of polymeric tanning agents with synthetic white tanning agents comprising phenol condensation products.

Pre-tannage of synthetic-vegetable tanned leather

To achieve a quicker penetration, especially of heavy skins, the use of polymeric tanning agents combined with neutral polyphosphates has proved valuable.

For this, delimed and bated pelts are placed for 2 hours in a fresh bath with about 50 to 100 percent of water (25° C.) and 3 to 5 percent of polymeric tanning agent. Subsequently, synthetic or vegetable tanning agents are added, as required for continuing the tanning process.

Restoration of leather and skins

Polymer products according to the invention are outstandingly suitable for the restoration of skins and leather, particularly antique leather.

The polymer product can be applied by spraying or hand application or from a bath. In general, treatment with 1–2 percent of polymer, by weight of the leather, applied from a 5–10 percent (by weight) solution thereof, is sufficient. Hair loosening caused by acid catalyzed hydrolysis is reduced and the tear resistance of the fiber network is improved.

The polymer products can be prepared by techniques known in the art. The polymers to be used for the invention can suitably be obtained by free-radical polymerization of the monomers in a known manner.

The preparation of aqueous dispersions can, for example, take place by an emulsion-addition or monomer-addition method. For this purpose, emulsifying agent, a portion of the initiator in an aqueous solution and, optionally, a protein hydrolyzate or polysaccharide suitable for graft polymerization, are placed in a polymerization vessel. To advantage, a hydrolytic decomposition to form the backbone may previously take place in the same container. The quantity of the initiator may fluctuate between certain limits. A recommended value is from 0.05 to 0.5 percent by weight of the monomers used.

Advantageous initiators are those which are inert with regard to amines, for example, representative azo-initiators [cf. J. Brandup, E. H. Immergut, in "Polymer Handbook", second edition, J. Wiley, (1975)].

The polymerization preferably takes place in a temperature range of 50° C. to 90° C.

As emulsifying agents, non-ionic emulsifying agents, such as addition products of phenols to ethylene oxide, can be used, for example, to which cationic emulsifying agents may also be added. The amount of emulsifier should be from 3 to 10 percent by weight of the polymerizable monomers.

Depending on the temperature, the polymerization process lasts generally about 3 to 10 hours.

The following Examples 1–5 illustrate preparation of the polymers, all of which have a Tg below 0° C.

EXAMPLE 1

In a polymerization vessel equipped with a reflux condenser, a stirrer, and a thermometer, 6 g of tetradecyl ammonium hydrochloride and 0.6 g of 4,4'-azo-bis-(4-cyanovalerianic acid)-sodium salt are dissolved in 500 g of water at 85° C.

To this solution is added dropwise over 4 hours an earlier prepared emulsion, consisting of:
  625.0 g of butyl acrylate,
  75.0 g of methyl methacrylate,
  80.0 g of dimethylaminoethyl methacrylate,
  22.0 g of methacrylic acid, 42.0 g of a reaction product of isononyl phenol and 100 mols of ethylene oxide, 1.0 g of tetradecyl ammonium hydrochloride, 2.4 of 4,4'-azobis-(4-cyanovaleric acid)-sodium salt, and 750.0 g water.

The batch is kept at 85° C. for one more hour, then let cool to room temperature.

A coagulate-free dispersion which can be easily filtered and having a solids content of about 40 percent is obtained. $\overline{M}_w = 10^6$

EXAMPLES 2-4

The procedure of Example 1 is followed but the monomer composition is changed as follows:

| Ex. | MMA | BA | EHA | DMM | DPM | AA | MA | * | $\overline{M}_w$ |
|-----|-----|----|----|------|------|-----|-----|----|------|
| 2 | 29 | — | 58.2 | 10 | — | — | 2.8 | — | $5(10^5)$ |
| 3 | 8 | 76 | — | — | 13 | — | 3 | — | $2.5(10^5)$ |
| 4 | 9 | 76 | — | — | 12.5 | 2.5 | — | — | $2.1(10^5)$ |
| 5 | 8 | 76 | — | — | — | — | 3 | 13 | — |
| 6 | 8 | 76 | — | — | — | — | 3 | 13 | — |

*(Ex. 5) = 3-(N,N-dimethylamino)benzyl methacrylate
*(Ex. 6) = 1-methacryloxy-3-(N-methyl, N-ethyl amino)-3,5,5-trimethylcyclohexane
MMA = methyl methacrylate
BA = butyl acrylate
EHA = 2-ethylhexyl acrylate
DMM = 2-dimethylaminoethyl methacrylate
DPM = 3-dimethylamino-2,3-dimethylpropyl methacrylate
AA = acrylic acid
MA = methacrylic acid As in Example 1, a dispersion is obtained which is coagulate-free, can be easily filtered, and has a solids content of about 40 percent. The particles in the dispersion of Example 3 have a radius of 500 Angstrom units.

EXAMPLE 5

(A) In a polymerization vessel equipped with a reflux condenser, a stirrer, and a thermometer, 40 g of gelatine are swelled in 550 g of water at 50° C. for about 20 minutes. After adding 0.4 g of a highly alkaline bacterial proteinase of *Bacillus firmus*, the pH is adjusted to 9.4 by adding about 35 g of 1% NaOH and the mixture is then stirred for 3 hours at 50° C. Then it is heated to 85° C. for 30 minutes, to destroy the enzyme. After adding 1.3 g of tetradecyl ammonium hydrochloride and 1.3 g of 4,4'-azobis-(4-cyanovalerianic acid)-sodium salt, there is added dropwise, over a period of four hours, a monomer mixture consisting of:

312 g of butyl acrylate, 37 g of methyl methacrylate, 40 g of 2-dimethylaminoethyl methacrylate, and 11 g of methacrylic acid.

The batch is stirred for another hour at 85° C., cooled to 60° C., and 20 g of a reaction product of isononyl phenol and 100 mols of ethylene oxide, dissolved in 100 g of water, are added. After the mixture has cooled to room temperature, a dispersion with a coagulate content of less than 0.5% is obtained. The dispersion can be easily filtered and has a solids content of about 50 percent. The radius of the dispersion particles is 1050 Angstrom units.

(B) A solution of 50 g of degraded gelatine (MW=3000) dissolved in 200 g of distilled water is added at room temperature to 1000 g of the dispersion prepared in (A). The mixture is stirred for a further 2 hours at room temperature and then filtered. An easily handled dispersion with a solids content of about 35 percent by weight is obtained.

(C) The procedure of (B) is repeated, but instead of enzymatically degraded gelatine, the same amount of enzymatically degraded collagen (MW=3000, corresponding to 30 amino acids per molecule) is used.

The following examples will serve to clarify the use of the polymers according to the invention for the treatment of pelts and leathers.

EXAMPLE 6

Post-treatment of crust leather to eliminate grain damage

Back-wetting: 100 kg of crust leather are placed in a vat with 400.0% of water, 50° C., 0.5% of a non-ionogenic wetting agent, and 0.5% of ammonia solution (25%)

and left overnight in the vat for the back-wetting process. For wetting, the mixture is initially stirred for 1 hour. In the course of the night, it is stirred 3 times for 15 minute periods.

Post-treatment: In a fresh float comprising 200.0% of water, 50° C., the batch is treated with 2.0% of the polymer product of Example 1 for 1 hour. 1.0% of sulfited spermacetic oil is added to the same float which is stirred again for 30 minutes.

After this time, the float is exhausted. During the night, the leathers are put on a horse, and are sammed, stretched, and dried the next day. After conditioning to equilibrate moisture, they are milled and ironed.

When checking the leather manually and visually, a natural grain appearance with an even shine and a soft and round feel are observed. The percentages relate to the dry weight of the crust leather.

EXAMPLE 7

Treatment of wet-blues for the elimination of grain damage during retannage

| Starting material: | 100 kg of wet-blues |
|---|---|
| Washing (tanning machine): | 80.0% of water, 30° C. Stir for 20 minutes. Discard the float. |
| Retanning: | 50.0% of water, 35° C., 3.0% of synthetic tanning substance, and 3.0% of the polymer product of Example 1. Agitate for 2 hours. |
| Neutralization: | 1.0% of sodium bicarbonate and 0.5% of sodium sulfite. Treat for 40 minutes. Discard the float. |

| | -continued |
|---|---|
| Washing: | 50.0% of water, 55° C.<br>Agitate for 20 minutes.<br>Discard the float. |
| Dyeing: | 50.0% of water, 55° C., and<br>2.0% of acid dye or substantive dye.<br>Agitate for 40 minutes. |
| Greasing: | 5.0% of emulsified synthetic oil,<br>5.0% of sulfochlorinated paraffin oil, and<br>5.0% of sulfatized deodorized fish oil are emulsified together with five times the amount of water at 60° C. and are added to the dye float.<br>Agitate for 40 minutes. |
| Acidification: | 1.0% of formic acid (85%, techn., 1:10) diluted, added in two portions separated by a 10 minute interval. |

Afterward, the leathers are left overnight on the horse and are sammed, stretched, and dried the next day. After conditioning, they are milled and ironed. Leather with a fine grain, an even coloring, and a soft feel is obtained. There are no uneven or spotty areas.

The percentages given are for the weight of the shaved leathers.

EXAMPLE 8

Use in retanning to improve the fullness and the grain firmness of leather

| | |
|---|---|
| Starting material: | 100 kg of chrome-tanned shoe upper leather, 1.5 mm thick. |
| Washing (mixer): | 80.0% of water, 35° C.<br>Agitate for 20 minutes.<br>Discard the float. |
| Retanning: | 50.0% of water, 30° C., and<br>5.0% of the polymer product of Example 1.<br>Agitate for 30 minutes. |
| Neutralization: | 2.0% of neutralizing tanning agent.<br>Agitate for 30 minutes.<br>Discard the float. |
| Washing: | 80.0% of water, 50° C.<br>Agitate for 20 minutes.<br>Discard the float. |
| Dyeing: | 50.0% of water, 55° C. and<br>1.0% of substantive dye.<br>Agitate for 40 minutes. |
| Greasing: | 2.0% of sulfatized train oil,<br>3.0% of emulsified synthetic oil, and<br>3.0% of sulfitized spermacetic oil are emulsified with water at 60° C. in a 1:5 ratio and are added to the dye bath.<br>Let run for another 40 minutes. |
| Acidifying: | 1.0% of formic acid (techn. 85%, diluted 1:10) is added.<br>Let run for another 20 minutes. |

The leather is placed overnight on a horse. Finishing occurs according to Example 6. When finished, the leather presents a satisfactory fullness and firmness of the grain.

Tear resistance has improved considerably in comparison with leathers retanned in a conventional manner.

The percentages given are for the weight of shaved leathers.

EXAMPLE 9

Solo-tannage using chromium-III salts - polymer product

| | |
|---|---|
| Starting material: | Delimed and bated calfskins |
| Weight of skins: | 100 kg |
| Pickling (vat): | 40.0% of water, 22° C. and<br>3.0% of table salt.<br>Agitate for 20 minutes.<br>0.4% of formic acid (techn. 85%, diluted 1:10) is added.<br>Agitate for 1 hour<br>pH value = 5.0.<br>0.4% of sulfuric acid (techn. 98%, diluted 1:10) is added.<br>Let run for another hour.<br>pH value = 3.8 |
| Tanning: | 4.0% of self-basifying alkaline chromium-III sulfate and<br>5.0% of the polymer product of Example 1.<br>Let run for another 4 hours. |
| Greasing: | Takes place in the tanning liquor with<br>5.0% of emulsified synthetic oil.<br>Let run for another 4 hours. |

Particular attention should be paid that, during the tanning process, the temperature of the float has to rise to at least 35° C. Otherwise, basification will not occur.

The final pH value of the float is 4.2.

The leather is placed on horses overnight and subsequently slowly air-dried.

A fine-grained calf-leather is obtained, boil-proof up to about 90° C.

The percentages given pertain to the pelt weight of skins.

EXAMPLE 10

Use for pre-treatment for chrome-tanning

| | |
|---|---|
| Starting material: | Delimed, bated bull hides |
| Weight of the hides: | 100 kg |
| Pre-treatment for chrome-tanning (mixer): | 50.0% of water, 22° C. and<br>4.0% of the polymer product of Example 1.<br>Agitate for 20 minutes.<br>0.8% of formic acid (85%, techn. diluted 1:10) is added.<br>Agitate for 2 hours.<br>pH value 3.8. |
| Chrome-tanning: | Occurs in the pre-treatment float.<br>3.0% of alkaline chromium-III sulfate with<br>26.0% of $Cr_2O_3$.<br>Agitate for 2 hours.<br>5.0% of self-basifying alkaline chromium-III sulfate with<br>30% $Cr_2O_3$.<br>Agitate for 6 hours.<br>Final pH value of the float = 4.0. |

It is necessary for the float temperature to rise to at least 35° C. in the course of the tanning process, otherwise basification will not occur and the leather will not become boil-proof.

After the chrome-tanning, the leathers are placed on horses and left overnight.

The leathers obtained will be smooth, with a good feel as well as a fine grain.

The percentages given are relative to the pelt weight of the materials.

The concentration values for solid products relate to grams per liter of water and for liquids to milliliters per liter of water.

EXAMPLE 11

Use in the dressing of furskins

| | |
|---|---|
| Starting material: | Soaked, fleshed, defatted, and centrifuged Australian sheepskin |
| Centrifuged weight: | 100 kg. |
| Float length for paddle processing: | 1:10 |
| Pickling: | 60 g of sodium chloride |
| | Paddle for 30 minutes. |
| | 5.0 ml of formic acid (85% techn.). |
| | Paddle for 20 minutes |
| | then paddle for 5 minute periods at 2 hour intervals. |
| | Final pH value = 4.8. |
| | After 12 hours, add |
| | 3.0 ml of sulfuric acid (conc.) |
| | Treat again for 12 hours paddling every 2 hours for 5 minutes. |
| | Final pH value of the float = 3.8. |
| Dressing: | Follows in the pickle float. |
| | 10 g of aluminum sulfate |
| | 5 g of the polymer of Example 1. |
| | Length of treatment: 24 hours |
| | Paddle for 5 minutes every 2 hours. |
| | Final pH value of the float = 3.5. |
| Greasing: | Follows in the dressing float. |
| | 10 g of sulfochlorinated synthetic oil emulsified before adding with 10 times the amount of water and then added to the dressing float. |
| | Length of treatment: 24 hours, |
| | Paddle for 5 minutes every 2 hours. |

After seasoning on horses, the skins are slowly air-dried. Subsequently, they are conditioned to equilibrate moisture, drummed, and wheeled.

The resulting sheepskins are fabric-soft, pliable, and have a good tear-resistance. They are not hygroscopic, as observed for sheepskins which have been dressed only with aluminum sulfate.

The concentration indications are given for solid products in grams/liter of water and for liquids in milliliters/liter of water.

EXAMPLE 12

Use in the production of white leather

| | |
|---|---|
| Starting material: | Delimed, bated cowhides. |
| Weight of the hides: | 100 kg, spilt thickness 1.2 mm. |
| Coloring: | No float |
| | 8.0% of the polymer product of Example 1 and |
| | 2.0% of zirconium sulfate. |
| | Agitate for 1 hour. |
| | 0.7% of formic acid (techn. 85%, diluted 1:10) is added. |
| | Let run for another hour |
| | Final pH value = 4.0. |
| | 0.6% of alkaline chromium-sulfate with |
| | 26.0% of Cr$_2$O$_3$. |
| | Agitate for 20 minutes. |
| | 0.7% of formic acid (techn. 85% diluted 1:10). |
| | Let run for one hour. |
| | pH value = 4.0. |

| | | |
|---|---|---|
| | -continued | |
| Washing: | 200.0% | water, 25° C. |
| | | Agitate for 20 minutes. |
| Final tanning: | 20.0% | of phenol-formaldehyde condensation product, |
| | 0.8% | of titanium dioxide, and |
| | 3.0% | of sulfochlorinated synthetic oil. |
| | | 3 hours' treatment. |

After greasing, the leather is placed on horses and finished in the usual manner.

The product obtained is full, round white leather, homogeneous also when cut.

The percentages indicated are relative to the weight of the starting material used (pelt weight).

EXAMPLE 13

Pre-tanning of synthetic-vegetable-tanned leathers

| | |
|---|---|
| Starting material: | Delimed, bated oxhides. |
| Weight of the hides: | 100 kg, spilt thickness 1.5 mm. |
| Pre-tanning (vat): | 80.0% of water, 25° C. |
| | 2.0% of the polymer product of Example 1, and |
| | 3.0% of neutral polymeric phosphates. |
| | Agitate for 1 hour. |
| | 0.5% of formic acid (85% techn. diluted 1:10) is added. |
| | Let run for another hour. |
| | pH 5.0. |
| | 0.5% of sulfuric acid (conc. 98% diluted 1:10). |
| | Let run for another hour, |
| | The hides remain overnight in the pre-tanning liquor. In the course of the night, agitate every hour for 2 minutes. |
| | pH value 3.8. |

With bromcresol green solution, the cut leathers show an even yellow coloring. The pH values of the float and of the cut are identical and are 3.8. The final tanning may take place in the same float with a combination of synthetic and vegetable tanning extracts. It is necessary to use 25% of pure tanning substance, relative to the weight of the hides.

The percentages indicated are relative to the weight of the starting material (pelt weight). The pre-tanned leathers are uniformly white, do not show any pulling of the grain, and are ready for final tanning within 24 to 36 hours.

EXAMPLE 14

Use for neutralization before or after the retanning of chrome-leather

| | |
|---|---|
| Starting material: | Shaved chrome-tanned shoe upper leather |
| Trimmed weight: | 100 kg, shaved thickness 1.8 mm |
| Washington (vat): | 150.0% of water, 35° C., and |
| | 0.2% of acetic acid. |
| | Agitate for 20 minutes. |
| | Drain the float. |
| Retanning: | 50.0% of water, 30° C., |
| | 3.0% aluminum syntan, and |
| | 3.0% naphthalene sulfonic acid condensation product. |
| | Agitate for 2 hours. |
| | pH value of the float 3.8. |
| | Drain the float. |

| | |
|---|---|
| Neutralization: | 50.0% of water, 25° C., |
| | 2.0% of the polymer product of Example 1, and |
| | 0.8% of sodium bicarbonate (diluted 1:10) are added. Agitate for 40 minutes. Final pH value of the float = 5.8. Cut leather: outer zone blue, central zone green. |

By washing, the leathers are brought to a temperature of 55° C. to 60° C. They are then dyed and greased in a fresh float in the usual manner.

When finished, the leathers have a fine grain, flat fat wrinkles, and an even coloring.

The percentages given are relative to the weight of the wet leather (shaved weight).

EXAMPLE 15

Use as a color equalizing agent

Salted, retanned, and neutralized chrome leather is washed twice with water (150 percent by weight of the leather in each wash, 60° C.). For equalization, the leather is agitated in a vat for 20 minutes in a float comprising 100 percent of water (60° C.) and 1 percent of the polymer product of Example 1. Then, 1 percent of a substantive dyestuff (dissolved in water 1:10) is added to the same bath for coloring and the batch is agitated for 30 minutes. For greasing, 10 percent of an emulsified greasing agent are then added.

EXAMPLE 16

Use for improving grease consumption

Example 7 is followed, except that the polymer product is not used in the retanning step, but in place of acidification in the same concentration.

EXAMPLE 17

Use for neutralization before or after the retanning of chrome leather

Example 14 is followed, except that the polymer product of Example 5, rather than Example 1, is used.

On visual inspection of the product, no inequalities can be detected. There is uniform uptake of water in all parts of the skin. Tear resistance, resistance to tear propagation, and stretch are about 15 percent better than in untreated leather.

What is claimed is:

1. A method for treating pelts or leather in the beamhouse, for tanning, or as an after-treatment, which method comprises contacting said pelts or leather with an aqueous dispersion of a copolymer comprising from 5 to 25 percent by weight of a compound of the formula

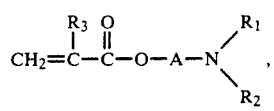

wherein $R_1$ and $R_2$ are each alkyl having 1 to 4 carbon atoms, $R_3$ is hydrogen or methyl, and A is alkyl having up to 10 carbon atoms or is an unsubstituted or alkyl-substituted carbocyclic or N- or O-heterocyclic group having up to 10 carbon atoms; from 67 to 92 percent by weight of an acrylate or methacrylate ester of an alkanol having 1 to 14 carbon atoms; and from 1 to 8 percent by weight of acrylic acid or methacrylic acid, whereby portions of said polymer are deposited in the grain layer without formation of a superficial film.

2. A method as in claim 1 wherein said copolymer has a glass temperature, Tg, which is below room temperature.

3. A method as in claim 1 wherein said copolymer has an average molecular weight between $2(10^4)$ and $5(10^6)$.

4. A method as in claim 1 wherein said copolymer is a graft copolymer wherein said monomers are present as graft monomers graft copolymerized onto a backbone polymer which is a polysaccharide or a protein hydrolyzate.

5. A method as in claim 1 wherein said copolymer is a copolymer of butyl acrylate, methyl methacrylate, dimethylaminoethyl methacrylate, and acrylic acid in a ratio by weight of (70 to 85):(5 to 15):(5 to 15):(1 to 5).

6. A method as in claim 4 wherein said backbone polymer and said graft monomers are present in a ratio by weight of at least 1:30 to 1:5.

7. A method as in claim 6 wherein said dispersion of graft copolymer comprises additional polysaccharide or protein hydrolyzate such that the ratio by weight of total polysaccharide or protein hydrolyzate, including that present in said graft copolymer, to said graft copolymer is from 1:5 to 1:1.

8. A method as in claim 4 wherein said protein hydrolyzate is a hydrolyzate of collagen or of gelatin.

9. A method as in claim 4 wherein said protein hydrolyzate has an average molecular weight from 1500 to 12000.

10. A method as in claim 4 wherein said protein hydrolyzate is a collagen hydrolyzate having from 10 to 100 amino acids per molecule.

11. A method as in claim 1 wherein said pelts or leather are treated with an aqueous dispersion of a copolymer having an average particle radius from 200 Angstrom units to 4000 Angstrom units.

12. A method as in claim 1 wherein the copolymer solids content of said dispersion is from 20 to 60 percent by weight.

13. A method as in claim 1 wherein said pelts or leather are contacted with said aqueous dispersion during post-tanning.

14. A method as in claim 13 wherein said aqueous dispersion additionally comprises tanning substances.

15. A method as in claim 1 wherein said aqueous dispersion is contacted with said pelts or leather to equalize the coloration thereof.

16. A method as in claim 1 wherein said aqueous dispersion is contacted with said pelts or leather as an ampholyte for the neutralization of chrome leather.

17. A method as in claim 1 wherein said aqueous dispersion is contacted with said pelts or leather to improve the grease consumption thereof.

18. A method as in claim 1 wherein said aqueous dispersion additionally comprises a mineral tanning substance and is contacted with furskins for the dressing thereof.

19. A method as in claim 1 wherein said aqueous dispersion is contacted with leather for the restoration thereof.

20. Pelts or leather treated by the method of claim 1.

* * * * *